United States Patent
Zhao (10) Patent No.: US 12,335,959 B2
(45) Date of Patent: Jun. 17, 2025

(54) CONFIGURED GRANT USAGE METHOD AND APPARATUS, NETWORK DEVICE AND TERMINAL

(71) Applicant: DATANG MOBILE COMMUNICATIONS EQUIPMENT CO., LTD., Beijing (CN)

(72) Inventor: Yali Zhao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 620 days.

(21) Appl. No.: 17/312,908

(22) PCT Filed: Aug. 27, 2019

(86) PCT No.: PCT/CN2019/102757
§ 371 (c)(1),
(2) Date: Jun. 10, 2021

(87) PCT Pub. No.: WO2020/119182
PCT Pub. Date: Jun. 18, 2020

(65) Prior Publication Data
US 2022/0070914 A1    Mar. 3, 2022

(30) Foreign Application Priority Data
Dec. 13, 2018 (CN) .......... 201811526608.2

(51) Int. Cl.
*H04W 72/23*        (2023.01)
*H04W 72/1263*     (2023.01)
(Continued)

(52) U.S. Cl.
CPC ....... *H04W 72/23* (2023.01); *H04W 72/1263* (2013.01); *H04W 72/535* (2023.01); *H04W 92/18* (2013.01)

(58) Field of Classification Search
CPC .............. H04W 72/23; H04W 72/535; H04W 72/1263; H04W 92/18
See application file for complete search history.

(56) References Cited

U.S. PATENT DOCUMENTS

| 2010/0098011 A1 | 4/2010 | Pelletier et al. |
| 2021/0168645 A1* | 6/2021 | Adjakple ............... H04W 72/54 |
| 2021/0219168 A1* | 7/2021 | Liu ....................... H04W 76/14 |

FOREIGN PATENT DOCUMENTS

| CN | 102257869 A | 11/2011 |
| CN | 103313396 A | 9/2013 |

(Continued)

OTHER PUBLICATIONS

Supplementary European Search Report in the European patent application No. 19895714.4, mailed on Dec. 22, 2021.
(Continued)

Primary Examiner — Rhonda L Murphy
(74) Attorney, Agent, or Firm — Ladas & Parry, LLP (57) ABSTRACT

The present disclosure provides a configured grant usage method and apparatus, a network device and a terminal. The method includes transmitting configuration information of logical channel to a terminal. A mapping relationship between the logical channel and a configured grant allocated to the terminal is configured in the configuration information.

8 Claims, 3 Drawing Sheets transmitting configuration information of logical channel to a terminal, where a mapping relationship between the logical channel and a configured grant is configured in the configuration information / 101

(51) Int. Cl.
*H04W 72/50* (2023.01)
*H04W 92/18* (2009.01)

(56) References Cited

FOREIGN PATENT DOCUMENTS

| CN | 108632779 A | 10/2018 |
|---|---|---|
| CN | 108811152 A | 11/2018 |
| EP | 3843489 A1 | 6/2021 |
| KR | 10-2018-0115326 A | 10/2018 |
| WO | 2018203733 A1 | 11/2018 |

OTHER PUBLICATIONS

First Office Action and search report for Chinese patent application No. 201811526608.2, mailed on Feb. 9, 2022 with EN translation provided by Global Dossier.
3GPP TSG-RAN WG2 Meeting #103bis R2-1813730 Chengdu, China, Oct. 8-12, 2018 Source: CATT Title: "Consideration on Uu MAC due to V2X transmission."
3GPP TSG-RAN2 Meeting#101bis R2-1804416 Sanya, China, Apr. 16-20, 2018 Source Huawei HiSilicon, Title: "Clarification of configured grants in BSR procedure."
3GPP TSG-RAN WG2#104 R2-1816983 Spokane, USA, Nov. 12-16, 2018 Source ZTE, Sanchips, Title: "Uu enhancements for NR V2X."
Huawei, HiSilicon, "Discussion on configuration grants and SR mask in BSR", R2-1807447, 3GPP TSG-RAN2 Meeting#102, Busan, Korea, May 21-25, 2018, all pages.
International Search Report from PCT/CN2019/102757, dated Nov. 27, 2019, with English translation from WIPO, all pages.
Written Opinion of the International Searching Authority from PCT/CN2019/102757, dated Nov. 27, 2019, with English translation from WIPO, all pages.
International Preliminary Report on Patentability from PCT/CN2019/102757, dated Jun. 8, 2021, with English translation from WIPO, all pages.
Office action from corresponding Korean Patent Application No. 10-2021-7021590 dated April 9. 2024, and its English translation.

* cited by examiner

FIG. 3 receiving configuration information of logical channel, where a mapping relationship between the logical channel and a configured grant is configured in the configuration information — 401

CONFIGURED GRANT USAGE METHOD AND APPARATUS, NETWORK DEVICE AND TERMINAL

CROSS-REFERENCE TO RELATED APPLICATIONS

This application is the U.S. national phase of PCT Application No. PCT/CN2019/102757 filed on Aug. 27, 2019, which claims the priority of Chinese Application No. 201811526608.2, filed on Dec. 13, 2018, the disclosures of which are incorporated herein by reference in their entireties.

TECHNICAL FIELD

The present disclosure relates to the field of communications technology, and in particular to a configured grant usage method and apparatus, a network device and a terminal.

BACKGROUND

The 5G New Radio (NR) system mainly supports three types of services including: enhanced Mobile Broadband (eMBB), massive Machine Type Communications (mMTC) and Ultra-Reliable and Low Latency Communications (URLLC).

A physical layer of the NR system supports multiple numerologies (i.e., baseband parameters)/transmission time intervals (TTIs).

The numerology is a baseband parameter. A main difference between different numerologies is that subcarrier spacings supported by different numerologies are different. For example, subcarrier spacings supported by the 5G NR system at least include 15 KHz and 60 KHz, and numerologies corresponding to these two different subcarrier spacings are two independent numerologies. Generally speaking, a numerology used by a high-speed terminal is different from a numerology used by a low-speed terminal; and a numerology used by a high-frequency terminal is also different from a numerology used by a low-frequency terminal. In addition to speed and frequency related to usage of different numerologies, another understanding in the industry is that numerologies that can be used by different services may also be different. For example, numerologies used by URLLC and eMBB may be different.

TTI is short for transmission time interval. In the traditional long term evolution (LTE) system, a length of TTI is 1 ms. Starting from LTE R14, in order to support time latency reduction, different TTI lengths have been introduced, such as one orthogonal frequency division multiplexing (OFDM) symbol length. Different TTI lengths continue to be used in the 5G system and may be applied to each numerology, that is, different numerologies in the 5G NR may use different TTI lengths or the same TTI length, and TTI lengths used for different terminals on a numerology may be dynamically changed at any one time. Selection of the TTI lengths is mainly related to service latency. For example, since an URLLC service has a relatively high latency requirement, a shorter TTI length, such as a TTI length of 1 OFDM symbol, may be selected.

For the NR system, numerology and/or TTI corresponding to a bearer/logical channel are configured through the network. For example, the network may configure numerology and/or TTI corresponding to a bearer/logical channel through Radio Resource Control (RRC) when the bearer/logical channel is established. Selection of TTI length is mainly related to the service latency. For example, for an URLLC service with a relatively high latency requirement, a shorter TTI length, such as a TTI length of 1 OFDM symbol, may be selected.

For an Industrial Internet of Things (IIoT) service which is likely to support multiple sets of configured scheduling grants on one BandWidth Part (BWP), it is needed to consider how to determine mapping relationship between logical channels and configured scheduling grants. There is no relevant solution in the public information.

SUMMARY

A purpose of the present disclosure is to provide a configured grant usage method and apparatus, a network device and a terminal, which can solve the problem of mapping between logical channels and multiple sets of configured scheduling grants.

In order to achieve the foregoing purpose, one embodiment of the present disclosure provides a configured grant usage method performed by a network device, including: transmitting configuration information of logical channel to a terminal, wherein a mapping relationship between the logical channel and a configured grant allocated to the terminal is configured in the configuration information.

Optionally, the configured grant includes: type-1 configured grant and/or type-2 configured grant.

Optionally, the logical channel includes: logical channel in Uu interface and/or logical channel in sidelink interface.

Optionally, in a case that the logical channel is the logical channel in the Uu interface, the configured grant is: a configured grant of the Uu interface; and/or, in a case that the logical channel is the logical channel in the sidelink interface, the configured grant is: a configured grant of the sidelink interface.

Optionally, the configuration information is a logical channel restriction corresponding to the logical channel, and the logical channel restriction carries information of a configured grant allowed to be used by the logical channel; the information of the configured grant allowed to be used by the logical channel indicates the mapping relationship between the logical channel and the configured grant allocated to the terminal.

Optionally, the information of the configured grant allowed to be used by the logical channel carried in the logical channel restriction, is an index of the configured grant allowed to be used by the logical channel;
  type-1 configured grants of Uu interface and type-2 configured grants of the Uu interface are indexed separately or collectively; or,
  type-1 configured grants of sidelink interface and type-2 configured grants of the sidelink interface are indexed separately or collectively; or,
  configured grants of the Uu interface and configured grants of the sidelink interface are indexed separately or collectively.

Optionally, the information of the configured grant allowed to be used by the logical channel carried by the logical channel restriction, includes at least one of the following information:
  first indication information of whether the logical channel is allowed to use a type-1 configured grant;
  second indication information of whether the logical channel is allowed to use a type-2 configured grant;
  a list of identifiers of configured grants allowed to be used by the logical channel;

a list of identifiers of type-1 configured grants allowed to be used by the logical channel; or, a list of identifiers of type-2 configured grants allowed to be used by the logical channel.

One embodiment of the present disclosure provides a configured grant usage method performed by a terminal, including: receiving configuration information of logical channel, wherein a mapping relationship between the logical channel and a configured grant allocated by a network device to the terminal is configured in the configuration information.

Optionally, the configured grant includes: type-1 configured grant and/or type-2 configured grant.

Optionally, the configured grant includes a configured grant of Uu interface and/or a configured grant of sidelink interface.

Optionally, in a case that the logical channel is logical channel in the Uu interface, the configured grant is: a configured grant of the Uu interface; and/or, in a case that the logical channel is logical channel in the sidelink interface, the configured grant is: a configured grant of the sidelink interface.

Optionally, the configuration information is a logical channel restriction corresponding to the logical channel, and the logical channel restriction carries information of a configured grant allowed to be used by the logical channel; the information of the configured grant allowed to be used by the logical channel indicates the mapping relationship between the logical channel and the configured grant allocated to the terminal.

Optionally, the information of the configured grant allowed to be used by the logical channel carried in the logical channel restriction, is an index of the configured grant allowed to be used by the logical channel;

type-1 configured grants of Uu interface and type-2 configured grants of the Uu interface are indexed separately or collectively; or, type-1 configured grants of sidelink interface and type-2 configured grants of the sidelink interface are indexed separately or collectively; or, configured grants of the Uu interface and configured grants of the sidelink interface are indexed separately or collectively.

Optionally, the information of the configured grant allowed to be used by the logical channel carried by the logical channel restriction, includes at least one of the following information:

first indication information of whether the logical channel is allowed to use a type-1 configured grant;

second indication information of whether the logical channel is allowed to use a type-2 configured grant;

a list of identifiers of configured grants allowed to be used by the logical channel;

a list of identifiers of type-1 configured grants allowed to be used by the logical channel; or, a list of identifiers of type-2 configured grants allowed to be used by the logical channel.

One embodiment of the present disclosure provides a network device, including: a transceiver, a memory, a processor, and a program stored in the memory and executable by the processor. The processor is used to read the program in the memory and control the transceiver to perform the following process: transmitting configuration information of logical channel to a terminal, wherein a mapping relationship between the logical channel and a configured grant allocated to the terminal is configured in the configuration information.

Optionally, the configured grant includes: type-1 configured grant and/or type-2 configured grant.

Optionally, the logical channel includes: logical channel in Uu interface and/or logical channel in sidelink interface.

Optionally, in a case that the logical channel is the logical channel in the Uu interface, the configured grant is: a configured grant of the Uu interface; and/or, in a case that the logical channel is the logical channel in the sidelink interface, the configured grant is: a configured grant of the sidelink interface.

Optionally, the configuration information is a logical channel restriction corresponding to the logical channel, and the logical channel restriction carries information of a configured grant allowed to be used by the logical channel; the information of the configured grant allowed to be used by the logical channel indicates the mapping relationship between the logical channel and the configured grant allocated to the terminal.

Optionally, the information of the configured grant allowed to be used by the logical channel carried in the logical channel restriction, is an index of the configured grant allowed to be used by the logical channel;

type-1 configured grants of Uu interface and type-2 configured grants of the Uu interface are indexed separately or collectively; or, type-1 configured grants of sidelink interface and type-2 configured grants of the sidelink interface are indexed separately or collectively; or, configured grants of the Uu interface and configured grants of the sidelink interface are indexed separately or collectively.

Optionally, the information of the configured grant allowed to be used by the logical channel carried by the logical channel restriction, includes at least one of the following information:

first indication information of whether the logical channel is allowed to use a type-1 configured grant;

second indication information of whether the logical channel is allowed to use a type-2 configured grant;

a list of identifiers of configured grants allowed to be used by the logical channel;

a list of identifiers of type-1 configured grants allowed to be used by the logical channel; or, a list of identifiers of type-2 configured grants allowed to be used by the logical channel.

One embodiment of the present disclosure provides a configured grant usage apparatus applied to a network device, including: a transmission module configured to transmit configuration information of logical channel to a terminal, wherein a mapping relationship between the logical channel and a configured grant allocated to the terminal is configured in the configuration information.

One embodiment of the present disclosure provides a computer-readable storage medium including a program stored thereon. The program is executed by a processor to perform steps of the foregoing configured grant usage method.

One embodiment of the present disclosure provides a terminal, including: a transceiver, a memory, a processor, and a program stored in the memory and executable by the processor. The processor is used to read the program in the memory and control the transceiver to perform the following process: receiving configuration information of logical channel, wherein a mapping relationship between the logical channel and a configured grant allocated by a network device to the terminal is configured in the configuration information.

Optionally, the configured grant includes: type-1 configured grant and/or type-2 configured grant.

Optionally, the configured grant includes a configured grant of Uu interface and/or a configured grant of sidelink interface.

Optionally, in a case that the logical channel is logical channel in the Uu interface, the configured grant is: a configured grant of the Uu interface; and/or, in a case that the logical channel is logical channel in the sidelink interface, the configured grant is: a configured grant of the sidelink interface.

Optionally, the configuration information is a logical channel restriction corresponding to the logical channel, and the logical channel restriction carries information of a configured grant allowed to be used by the logical channel; the information of the configured grant allowed to be used by the logical channel indicates the mapping relationship between the logical channel and the configured grant allocated to the terminal.

Optionally, the information of the configured grant allowed to be used by the logical channel carried in the logical channel restriction, is an index of the configured grant allowed to be used by the logical channel;
- type-1 configured grants of Uu interface and type-2 configured grants of the Uu interface are indexed separately or collectively; or,
- type-1 configured grants of sidelink interface and type-2 configured grants of the sidelink interface are indexed separately or collectively; or,
- configured grants of the Uu interface and configured grants of the sidelink interface are indexed separately or collectively.

Optionally, the information of the configured grant allowed to be used by the logical channel carried by the logical channel restriction, includes at least one of the following information:
- first indication information of whether the logical channel is allowed to use a type-1 configured grant;
- second indication information of whether the logical channel is allowed to use a type-2 configured grant;
- a list of identifiers of configured grants allowed to be used by the logical channel;
- a list of identifiers of type-1 configured grants allowed to be used by the logical channel; or,
- a list of identifiers of type-2 configured grants allowed to be used by the logical channel.

One embodiment of the present disclosure provides a configured grant usage apparatus applied to a terminal, including: a receiving module configured to receive configuration information of logical channel, wherein a mapping relationship between the logical channel and a configured grant allocated by a network device to the terminal is configured in the configuration information.

One embodiment of the present disclosure provides a computer-readable storage medium including a program stored thereon. The program is executed by a processor to perform steps of the foregoing configured grant usage method.

The foregoing technical solutions of the present disclosure have at least the following beneficial effects:

In the configured grant usage method and apparatus, the network device and the terminal of embodiments of the present disclosure, when the network device configures the logical channel for the terminal, a mapping relationship between the logical channel and the configured grant is directly configured, so that the terminal can determine the mapping relationship between the logical channel and the configured grant according to the configuration information of the logical channel. Therefore, this method has less impact on the priority of the logical channel.

DETAILED DESCRIPTION

In order to make the technical problems to be solved, technical solutions and advantages of the present disclosure clearer, a detailed description is given hereinafter with reference to the accompanying drawings and specific embodiments.

Figure 1:
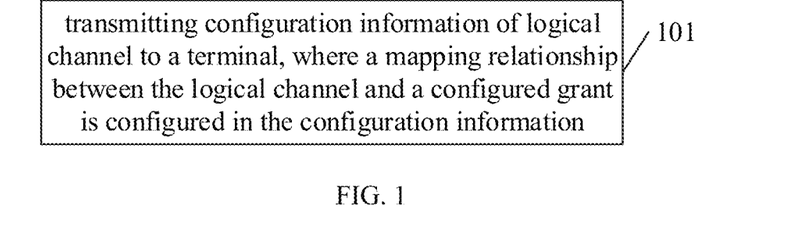
FIG. 1 is a first schematic diagram showing a step of a configured grant usage method according to an embodiment of the present disclosure.

As shown in FIG. 1, one embodiment of the present disclosure provides a configured grant usage method performed by a network device. The method includes:

Step 101: transmitting configuration information of logical channel to a terminal, where a mapping relationship between the logical channel and a configured grant allocated to the terminal is configured in the configuration information.

It should be noted that the configured grant refers to periodic resource pre-configured by the network device for the terminal, which is specifically divided into type-1 configured grants and type-2 configured grants. Type-1 specifically means that the network configures location and cycle of resources for the terminal through radio resource control (RRC) signaling, without explicit signaling to activate configured grants. Type-2 means that the network configures cycle and radio network temporary identity (RNTI) of configured grants for the terminal through radio resource control (RRC) signaling, but specific time/frequency resources are carried by a configured grant activation signaling, i.e., physical downlink control channel (PDCCH).

Specifically, when the network configures logical channel (LCH) restrictions for logical channel, it carries information of a configured grant allowed to be used by the logical channel.

As an optional embodiment, the configuration information is a logical channel restriction corresponding to logical channel, and the logical channel restriction carries information of a configured grant allowed to be used by the logical channel.

The information of a configured grant allowed to be used by the logical channel is used to indicate the mapping relationship between the logical channel and the configured grant allocated to the terminal.

Optionally, in the foregoing embodiment of the present disclosure, the configured grant includes: type-1 configured grant and/or type-2 configured grant.

Optionally, in the foregoing embodiment of the present disclosure, the logical channel includes: logical channel in Uu interface and/or logical channel in a sidelink interface (also referred to as a direct communication interface or an SL interface).

Optionally, in the foregoing embodiment of the present disclosure, in a case that the logical channel is logical channel in Uu interface, the configured grant is: a configured grant of the Uu interface; and/or, in a case that the logical channel is logical channel in sidelink interface, the configured grant is: a configured grant of the sidelink interface.

In short, the configured grant includes at least one of the following:
Type-1 configured grant of the Uu interface;
Type-2 configured grant of the Uu interface,
Type-1 configured grant of the sidelink interface;
Type-2 configured grant of the sidelink interface;
configured grant of the Uu interface;
configured grant of the sidelink interface.

As an optional embodiment, the information of the configured grant allowed to be used by the logical channel carried in the logical channel restriction, is identifier information of the configured grant allowed to be used by the logical channel, such as an index of the configured grant allowed to be used by the logical channel.

The type-1 configured grant of the Uu interface and the type-2 configured grant of the Uu interface may be indexed separately or collectively; or, the type-1 configured grant of the sidelink interface and the type-2 configured grant of the SL interface may be indexed separately or collectively; or, the configured grant of the Uu interface and the configured grant of the sidelink interface may be indexed separately or collectively.

Optionally, in the foregoing embodiment of the present disclosure, the information of the configured grant allowed to be used by the logical channel carried by the logical channel restriction, includes at least one of the following information:
first indication information of whether the logical channel is allowed to use the type-1 configured grant;
second indication information of whether the logical channel is allowed to use the type-2 configured grant;
a list of identifiers of configured grants allowed to be used by the logical channel; a situation where type-1 configured grants and type-2 configured grants are indexed collectively;
a list of identifiers of type-1 configured grants allowed to be used by the logical channel; a situation where type-1 configured grants and type-2 configured grants are indexed separately; or,
a list of identifiers of type-2 configured grants allowed to be used by the logical channel; a situation where type-1 configured grants and type-2 configured grants are indexed separately.

In order to more clearly describe the configured grant usage method according to the embodiment of the present disclosure, the configured grant usage method is described in detail hereinafter with reference to four examples.

First example with Uu interface and type-1 configured grants and type-2 configured grants being indexed collectively.

Figure 2:
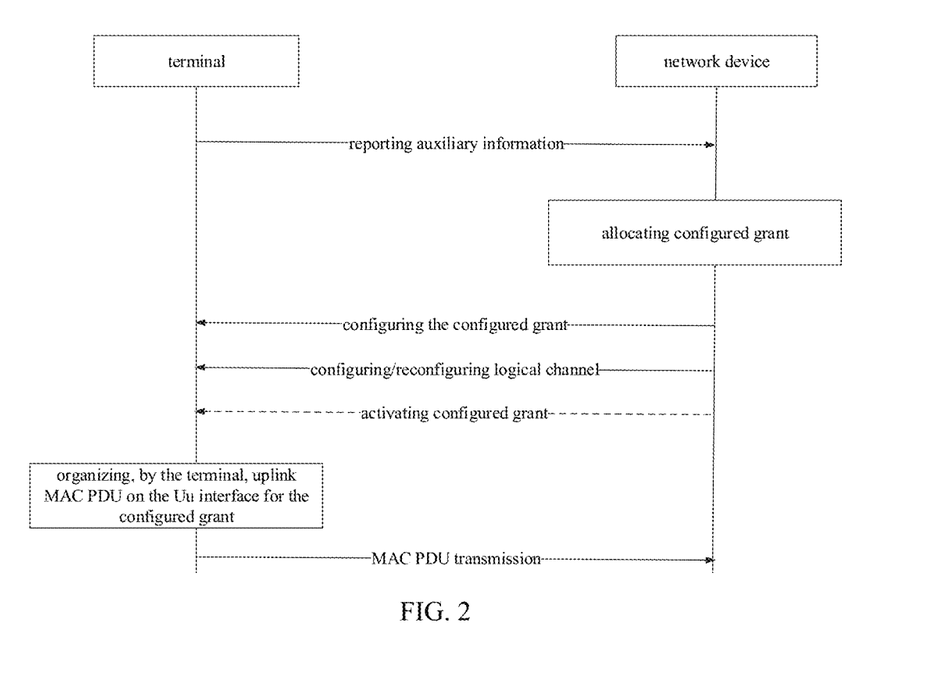
FIG. 2 is a schematic diagram showing interaction of Uu interface in a configured grant usage method according to an embodiment of the present disclosure.

As shown in FIG. 2, the configured grant usage method includes the following steps:

Step 21: reporting auxiliary information; i.e., reporting, by a terminal, auxiliary information to a network device, where the auxiliary information is used to assist the network device to configure configured grants for Uu interface.

The auxiliary information includes, but is not limited to, the following content: logical channel identifier (LCID), period, offset and data packet size of logical channel of the terminal at the Uu interface.

Step 22: allocating a configured grant; i.e., according to the auxiliary information reported by the terminal in the step 21, determining, by the network device, a configured grant allocated to the terminal.

The configured grant may be, but are not limited to, type-1 and/or type-2 configured grants. In a case that an index of the configured grant is used to identify the configured grant, the type-1 configured grant and the type-2 configured grant are indexed collectively.

Step 23: configuring the configured grant; i.e., transmitting, by the network device, configuration information of the configured grant to the terminal. In this configuration process, radio resource control (RRC) reconfiguration signaling may be used. The configuration information includes, but is not limited to: an identifier of the configured grant (such as an index of the configured grant), type indication information of the configured grant, a period corresponding to the configured grant, frequency domain resource indication information corresponding to the configured grant, modulation and coding scheme (MCS), etc.

Step 24: configuring/reconfiguring logical channel; i.e., performing, by the network device, logical channel configuration. When the network device configures the logical channel for the terminal, the network device directly configures a mapping relationship between the logical channel and the configured grant. Specifically, when the network device configures a logical channel (LCH) restriction corresponding to the logical channel, the LCH restriction carries information of the configured grant allowed to be used by the logical channel.

In specific implementation, since type 1 configured grants and type-2 configured grants are indexed uniformly, the corresponding LCH restriction related to the configured grant includes at least one or a combination of the following:
first indication information of whether to allow to use the type-1 configured grant;
second indication information of whether to allow to use the type-2 configured grant;
a list of identifiers of configured grants allowed to be used (for example, a list of indexes of configured grants).

The step 24 and the step 23 may use the same RRC reconfiguration signaling, or may use two RRC reconfiguration signalings. In a case of two RRC reconfiguration signaling, there is no strict requirement on transmission time of the two RRC reconfiguration signaling, for example, the signaling in the step 23 may be transmitted first, or the signaling in the step 24 may be transmitted first.

Step 25: activating the configured grant; an optional step, this step is only required for the type-2 configured grant, and this step is used to activate the type-2 configured grant.

Step 26: organizing, by the terminal, uplink MAC PDU on the Uu interface for the configured grant, i.e., logical channel priority (LCP) process. An example that the LCH restriction at least includes a list of identifiers of the configured grant allowed to be used, is used for illustration.

First, for each uplink (UL) scheduling grant, selecting logical channel that is able to use the UL grant; for each UL grant, logical channel that is able to use the UL grant may be selected according to the following requirements (the following requirements need to be met at the same time):

in a case that logical channels are configured with allowedSCS-List, it is needed to select logical channel with a configured allowedSCS-List including SCS of the UL grant;

in a case that logical channels are configured with maxPUSCH-Duration, it is needed to select logical channel with a configured maxPUSCH-Duration being greater than or equal to a PUSCH transmission duration corresponding to the UL grant;

in a case that logical channels are configured with a list of identifiers of configured grants allowed to be used, it is needed to select logical channel with a configured list of identifiers of configured grants allowed to be used including an identifier of a configured grant corresponding to the UL grant;

the UL grant is in allowedServingCells configured for the logical channel.

Then, for each UL grant, resource allocation is performed for the logical channel that is able to use the UL grant in a way including:

for all logical channels with Bj (available tokens in a token bucket)>0, allocating resources required to meet PBR requirements in descending order of priorities;

according to resource allocation in the previous step, updating the Bj of each logical channel;

in a case there are remaining resources, allocating the remaining resources to various logical channels in the descending order of priorities of the various logical channels again, until the resources are exhausted or there is no data requiring for resource allocation.

Step 27: MAC PDU transmission, i.e., performing data transmission according to the MAC PDU organized in the step 26 on the configured grant.

Second example with Uu interface and type-1 configured grants and type-2 configured grants being indexed separately.

As shown in FIG. 2, the configured grant usage method resources includes the following steps:

Step 31: reporting auxiliary information; i.e., reporting, by a terminal, auxiliary information to a network device, where the auxiliary information is used to assist the network device to configure configured grants for Uu interface.

The auxiliary information includes, but is not limited to, the following content: logical channel identifier (LCID), period, offset and data packet size of logical channel of the terminal at the Uu interface.

Step 32: allocating a configured grant; i.e., according to the auxiliary information reported by the terminal in the step 31, determining, by the network device, a configured grant allocated to the terminal.

The configured grant may be, but are not limited to, type-1 and/or type-2 configured grants. In a case that an index of the configured grant is used to identify the configured grant, the type-1 configured grant and the type-2 configured grant are indexed separately.

Step 33: configuring the configured grant; i.e., transmitting, by the network device, configuration information of the configured grant to the terminal. In this configuration process, radio resource control (RRC) reconfiguration signaling may be used. The configuration information includes, but is not limited to: an identifier of the configured grant (such as an index of the configured grant), type indication information of the configured grant, a period corresponding to the configured grant, frequency domain resource indication information corresponding to the configured grant, modulation and coding scheme (MCS), etc.

Step 34: configuring/reconfiguring logical channel; i.e., performing, by the network device, logical channel configuration. When the network device configures the logical channel for the terminal, the network device directly configures a mapping relationship between the logical channel and the configured grant. Specifically, when the network device configures a logical channel (LCH) restriction corresponding to the logical channel, the LCH restriction carries information of the configured grant allowed to be used by the logical channel.

In specific implementation, since type 1 configured grants and type-2 configured grants are indexed separately, the corresponding LCH restriction related to the configured grant includes at least one or a combination of the following:

first indication information of whether to allow to use the type-1 configured grant;

second indication information of whether to allow to use the type-2 configured grant;

a list of identifiers of configured grants allowed to be used under Type-1;

a list of identifiers of configured grants allowed to be used under Type-2.

The step 34 and the step 33 may use the same RRC reconfiguration signaling, or may use two RRC reconfiguration signalings. In a case of two RRC reconfiguration signaling, there is no strict requirement on transmission time of the two RRC reconfiguration signaling, for example, the signaling in the step 33 may be transmitted first, or the signaling in the step 34 may be transmitted first.

Step 35: activating the configured grant; an optional step, this step is only required for the type-2 configured grant, and this step is used to activate the type-2 configured grant.

Step 36: organizing, by the terminal, uplink MAC PDU on the Uu interface for the configured grant, i.e., logical channel priority (LCP) process. An example that the LCH restriction at least includes a list of identifiers of the configured grant allowed to be used under Type-2, is used for illustration.

First, for each uplink (UL) scheduling grant, selecting logical channel that is able to use the UL grant; for each UL grant, logical channel that is able to use the UL grant may be selected according to the following requirements (the following requirements need to be met at the same time):

in a case that logical channels are configured with allowedSCS-List, it is needed to select logical channel with a configured allowedSCS-List including SCS of the UL grant;

in a case that logical channels are configured with maxPUSCH-Duration, it is needed to select logical channel with a configured maxPUSCH-Duration being greater than or equal to a PUSCH transmission duration corresponding to the UL grant;

in a case that the UL grant is a type-2 configured grant, and the logical channels are configured with a list of identifiers of type-2 configured grants allowed to be used, it is needed to select logical channel with a configured list of identifiers of type-2 configured grants allowed to be used including an identifier of a configured grant corresponding to the UL grant;

the UL grant is in allowedServingCells configured for the logical channel.

Then, for each UL grant, resource allocation is performed for the logical channel that is able to use the UL grant in a way including:

for all logical channels with Bj (available tokens in a token bucket)>0, allocating resources required to meet PBR requirements in descending order of priorities;

according to resource allocation in the previous step, updating the Bj of each logical channel;

in a case there are remaining resources, allocating the remaining resources to various logical channels in the descending order of priorities of the various logical channels again, until the resources are exhausted or there is no data requiring for resource allocation.

Step 37: MAC PDU transmission, i.e., performing data transmission according to the MAC PDU organized in the step 36 on the configured grant.

Third example with sidelink interface and type-1 configured grants and type-2 configured grants being indexed collectively.

Figure 3:
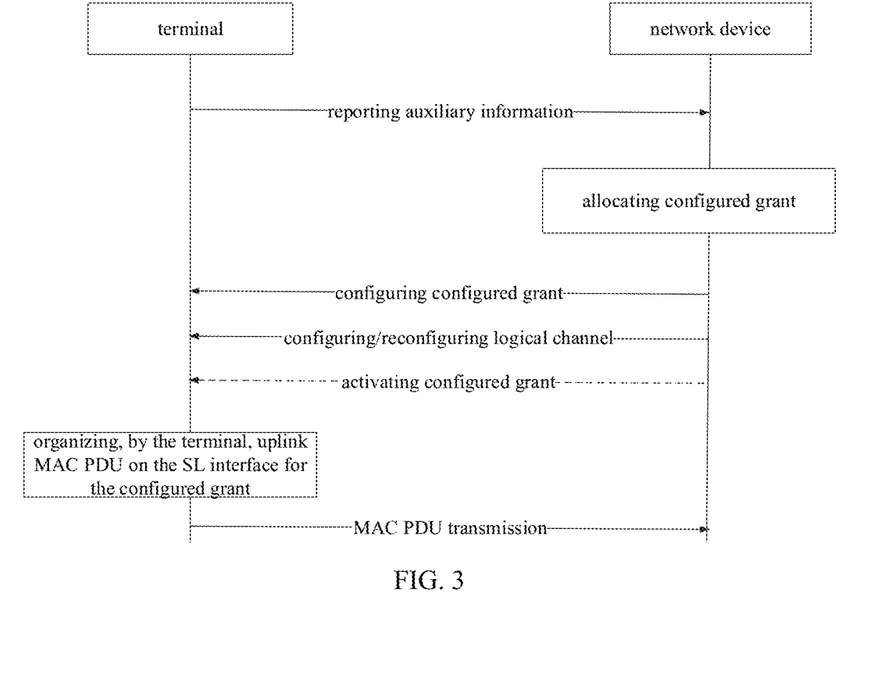
FIG. 3 is a schematic diagram showing interaction of sidelink interface in a configured grant usage method according to an embodiment of the present disclosure.

As shown in FIG. 3, the configured grant usage method resources includes the following steps:

Step 41: reporting auxiliary information; i.e., reporting, by a terminal, auxiliary information to a network device, where the auxiliary information is used to assist the network device to configure configured grants for SL interface.

The auxiliary information includes, but is not limited to, the following content: logical channel identifier (LCID), period, offset and data packet size of logical channel of the terminal at the SL interface.

Step 42: allocating a configured grant; i.e., according to the auxiliary information reported by the terminal in the step 41, determining, by the network device, a configured grant allocated to the terminal.

The configured grant may be, but are not limited to, type-1 and/or type-2 configured grants. In a case that an index of the configured grant is used to identify the configured grant, the type-1 configured grant and the type-2 configured grant are indexed collectively.

Step 43: configuring the configured grant; i.e., transmitting, by the network device, configuration information of the configured grant to the terminal. In this configuration process, radio resource control (RRC) reconfiguration signaling may be used. The configuration information includes, but is not limited to: an identifier of the configured grant (such as an index of the configured grant), type indication information of the configured grant, a period corresponding to the configured grant, frequency domain resource indication information corresponding to the configured grant, modulation and coding scheme (MCS), etc.

Step 44: configuring/reconfiguring logical channel; i.e., performing, by the network device, logical channel configuration. When the network device configures the logical channel for the terminal, the network device directly configures a mapping relationship between the logical channel and the configured grant. Specifically, when the network device configures a logical channel (LCH) restriction corresponding to the logical channel, the LCH restriction carries information of the configured grant allowed to be used by the logical channel.

In specific implementation, since type 1 configured grants and type-2 configured grants are indexed uniformly, the corresponding LCH restriction related to the configured grant includes at least one or a combination of the following:

first indication information of whether to allow to use the type-1 configured grant;

second indication information of whether to allow to use the type-2 configured grant;

a list of identifiers of configured grants allowed to be used (for example, a list of indexes of configured grants).

The step 44 and the step 43 may use the same RRC reconfiguration signaling, or may use two RRC reconfiguration signalings. In a case of two RRC reconfiguration signaling, there is no strict requirement on transmission time of the two RRC reconfiguration signaling, for example, the signaling in the step 43 may be transmitted first, or the signaling in the step 44 may be transmitted first.

Step 45: activating the configured grant; an optional step, this step is only required for the type-2 configured grant, and this step is used to activate the type-2 configured grant.

Step 46: organizing, by the terminal, uplink MAC PDU on the SL interface for the configured grant, i.e., logical channel priority (LCP) process. An example that the LCH restriction at least includes a list of identifiers of the configured grant allowed to be used, is used for illustration.

First, for each direct communication scheduling (SL) grant, selecting logical channel in the sidelink interface, which is able to use the SL grant; for each SL grant, logical channel that is able to use the SL grant may be selected according to the following requirements (the following requirements need to be met at the same time):

in a case that logical channels are configured with allowedSCS-List, it is needed to select logical channel with a configured allowedSCS-List including SCS of the SL grant;

in a case that logical channels are configured with a maximum TTI length allowed for the SL interface, then it is needed to select logical channel with a configured maximum TTI length being greater than or equal to a TTI length corresponding to the SL grant;

in a case that logical channels are configured with a list of identifiers of configured grants allowed to be used, it is needed to select logical channel with a configured list of identifiers of configured grants allowed to be used including an identifier of a configured grant corresponding to the SL grant.

Then, resource allocation is performed for each SL grant in a way including:

further screening the selected logical channels in the sidelink interface to select logical channels with a target identifier in the sidelink interface, and sorting the selected logical channels in descending order of priorities;

sequentially allocating resources to each logical channel in the sidelink interface in the determined descending order, until the resource is exhausted, or data of all logical channels corresponding to the target identifier in the sidelink interface has been allocated with resources.

Step 47: MAC PDU transmission, i.e., performing data transmission according to the MAC PDU organized in the step 46 on the configured grant.

Further example with sidelink interface and type-1 configured grants and type-2 configured grants being indexed separately.

As shown in FIG. 3, the configured grant usage method resources includes the following steps:

Step 51: reporting auxiliary information; i.e., reporting, by a terminal, auxiliary information to a network device, where the auxiliary information is used to assist the network device to configure configured grants for SL interface.

The auxiliary information includes, but is not limited to, the following content: logical channel identifier (LCID), period, offset and data packet size of logical channel of the terminal at the SL interface.

Step 52: allocating a configured grant; i.e., according to the auxiliary information reported by the terminal in the step 51, determining, by the network device, a configured grant allocated to the terminal.

The configured grant may be, but are not limited to, type-1 and/or type-2 configured grants. In a case that an index of the configured grant is used to identify the configured grant, the type-1 configured grant and the type-2 configured grant are indexed separately.

Step 53: configuring the configured grant; i.e., transmitting, by the network device, configuration information of the configured grant to the terminal. In this configuration process, radio resource control (RRC) reconfiguration signaling may be used. The configuration information includes, but is not limited to: an identifier of the configured grant (such as an index of the configured grant), type indication information of the configured grant, a period corresponding to the configured grant, frequency domain resource indication information corresponding to the configured grant, modulation and coding scheme (MCS), etc.

Step 54: configuring/reconfiguring logical channel; i.e., performing, by the network device, logical channel configuration. When the network device configures the logical channel for the terminal, the network device directly configures a mapping relationship between the logical channel and the configured grant. Specifically, when the network device configures a logical channel (LCH) restriction corresponding to the logical channel, the LCH restriction carries information of the configured grant allowed to be used by the logical channel.

In specific implementation, since type 1 configured grants and type-2 configured grants are indexed separately, the corresponding LCH restriction related to the configured grant includes at least one or a combination of the following:
first indication information of whether to allow to use the type-1 configured grant;
second indication information of whether to allow to use the type-2 configured grant;
a list of identifiers of configured grants allowed to be used under Type-1;
a list of identifiers of configured grants allowed to be used under Type 2.

The step 54 and the step 53 may use the same RRC reconfiguration signaling, or may use two RRC reconfiguration signalings. In a case of two RRC reconfiguration signaling, there is no strict requirement on transmission time of the two RRC reconfiguration signaling, for example, the signaling in the step 53 may be transmitted first, or the signaling in the step 54 may be transmitted first.

Step 55: activating the configured grant; an optional step, this step is only required for the type-2 configured grant, and this step is used to activate the type-2 configured grant.

Step 56: organizing, by the terminal, uplink MAC PDU on the Uu interface for the configured grant, i.e., logical channel priority (LCP) process. An example that the LCH restriction at least includes a list of identifiers of the configured grant allowed to be used under Type-2, is used for illustration.

First, for each direct communication scheduling (SL) grant, selecting logical channel in the sidelink interface, which is able to use the SL grant; for each SL grant, logical channel that is able to use the SL grant may be selected according to the following requirements (the following requirements need to be met at the same time):

in a case that logical channels are configured with allowedSCS-List, it is needed to select logical channel with a configured allowedSCS-List including SCS of the SL grant;
in a case that logical channels are configured with a maximum TTI length allowed for the SL interface, then it is needed to select logical channel with a configured maximum TTI length being greater than or equal to a TTI length corresponding to the SL grant;
in a case that the SL grant is a type-2 configured grant, and the logical channels are configured with a list of identifiers of type-2 configured grants allowed to be used, it is needed to select logical channel with a configured list of identifiers of type-2 configured grants allowed to be used including an identifier of a configured grant corresponding to the SL grant.

Then, resource allocation is performed for each SL grant in a way including:
further screening the selected logical channels in the sidelink interface to select logical channels with a target identifier in the sidelink interface, and sorting the selected logical channels in descending order of priorities;
sequentially allocating resources to each logical channel in the sidelink interface in the determined descending order, until the resource is exhausted, or data of all logical channels corresponding to the target identifier in the sidelink interface has been allocated with resources.

Step 57: MAC PDU transmission, i.e., performing data transmission according to the MAC PDU organized in the step 56 on the configured grant.

In summary, in the foregoing embodiments of the present disclosure, when the network device configures the logical channel for the terminal, a mapping relationship between the logical channel and the configured grant is directly configured, so that the terminal can determine the mapping relationship between the logical channel and the configured grant according to the configuration information of the logical channel. Therefore, this method has less impact on the priority of the logical channel.

Figure 4:
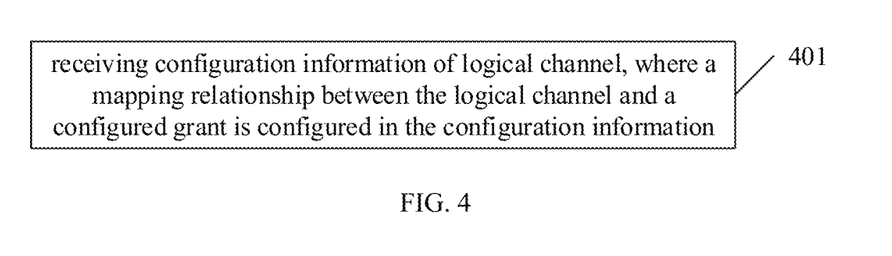
FIG. 4 is a second schematic diagram showing a step of a configured grant usage method according to an embodiment of the present disclosure.

As shown in FIG. 4, one embodiment of the present disclosure further provides a configured grant usage method performed by a terminal. The method includes:

Step 401: receiving configuration information of logical channel, where a mapping relationship between the logical channel and a configured grant allocated by a network device to the terminal is configured in the configuration information.

Specifically, when the network configures logical channel (LCH) restrictions for logical channel, it carries information of a configured grant allowed to be used by the logical channel.

As an optional embodiment, the configuration information is a logical channel restriction corresponding to logical channel, and the logical channel restriction carries information of a configured grant allowed to be used by the logical channel.

The information of a configured grant allowed to be used by the logical channel is used to indicate the mapping relationship between the logical channel and the configured grant allocated to the terminal.

Optionally, in the foregoing embodiment of the present disclosure, the configured grant includes: type-1 configured grant and/or type-2 configured grant.

Optionally, in the foregoing embodiment of the present disclosure, the configured grant includes a configured grant of Uu interface and/or a configured grant of sidelink interface (also referred to as direct communication interface or an SL interface).

Optionally, in the foregoing embodiment of the present disclosure, in a case that the logical channel is logical channel in Uu interface, the configured grant is: a configured grant of the Uu interface; and/or, in a case that the logical channel is logical channel in sidelink interface, the configured grant is: a configured grant of the sidelink interface.

In short, the configured grant includes at least one of the following:
 Type-1 configured grant of the Uu interface;
 Type-2 configured grant of the Uu interface,
 Type-1 configured grant of the sidelink interface;
 Type-2 configured grant of the sidelink interface;
 configured grant of the Uu interface;
 configured grant of the sidelink interface.

As an optional embodiment, the information of the configured grant allowed to be used by the logical channel carried in the logical channel restriction, is identifier information of the configured grant allowed to be used by the logical channel, such as an index of the configured grant allowed to be used by the logical channel.

The type-1 configured grant of the Uu interface and the type-2 configured grant of the Uu interface may be indexed separately or collectively; or,
 the type-1 configured grant of the sidelink interface and the type-2 configured grant of the SL interface may be indexed separately or collectively; or,
 the configured grant of the Uu interface and the configured grant of the sidelink interface may be indexed separately or collectively.

Optionally, in the foregoing embodiment of the present disclosure, the information of the configured grant allowed to be used by the logical channel carried by the logical channel restriction, includes at least one of the following information:
 first indication information of whether the logical channel is allowed to use the type-1 configured grant;
 second indication information of whether the logical channel is allowed to use the type-2 configured grant;
 a list of identifiers of configured grants allowed to be used by the logical channel; a situation where type-1 configured grants and type-2 configured grants are indexed collectively;
 a list of identifiers of type-1 configured grants allowed to be used by the logical channel; a situation where type-1 configured grants and type-2 configured grants are indexed separately; or,
 a list of identifiers of type-2 configured grants allowed to be used by the logical channel; a situation where type-1 configured grants and type-2 configured grants are indexed separately.

In summary, in the foregoing embodiments of the present disclosure, when the network device configures the logical channel for the terminal, a mapping relationship between the logical channel and the configured grant is directly configured, so that the terminal can determine the mapping relationship between the logical channel and the configured grant according to the configuration information of the logical channel. Therefore, this method has less impact on the priority of the logical channel.

Figure 5:
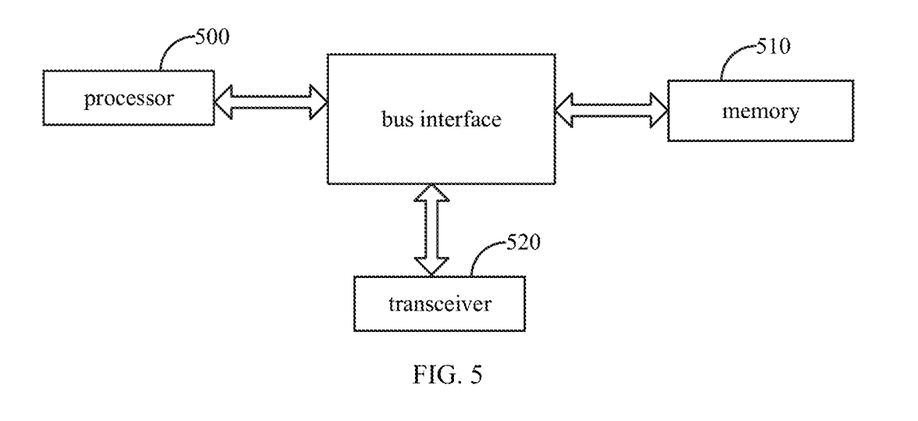
FIG. 5 is a schematic structural diagram of each of a network device and a terminal according to an embodiment of the present disclosure.

As shown in FIG. 5, one embodiment of the present disclosure further provides a network device, including: a transceiver 520, a memory 510, a processor 500, and a program stored on the memory 510 and executable by the processor 500. The processor 500 is configured to read the program in the memory and control the transceiver 520 to execute the following process: transmitting configuration information of logical channel to a terminal, where a mapping relationship between the logical channel and a configured grant allocated to the terminal is configured in the configuration information.

Optionally, in the foregoing embodiment of the present disclosure, the configured grant includes: type-1 configured grant and/or type-2 configured grant.

Optionally, in the foregoing embodiment of the present disclosure, the logical channel includes: logical channel on Uu interface and/or logical channel on sidelink interface.

Optionally, in the foregoing embodiment of the present disclosure, in a case that the logical channel is logical channel in Uu interface, the configured grant is: a configured grant of the Uu interface;
 in a case that the logical channel is logical channel in sidelink interface, the configured grant is: a configured grant of the sidelink interface.

Optionally, in the foregoing embodiment of the present disclosure, the configuration information is a logical channel restriction corresponding to logical channel, and the logical channel restriction carries information of a configured grant allowed to be used by the logical channel.

The information of a configured grant allowed to be used by the logical channel is used to indicate the mapping relationship between the logical channel and the configured grant allocated to the terminal.

Optionally, in the foregoing embodiment of the present disclosure, the information of the configured grant allowed to be used by the logical channel carried in the logical channel restriction, is an index of the configured grant allowed to be used by the logical channel.

The type-1 configured grant of the Uu interface and the type-2 configured grant of the Uu interface may be indexed separately or collectively; or,
 the type-1 configured grant of the sidelink interface and the type-2 configured grant of the SL interface may be indexed separately or collectively; or,
 the configured grant of the Uu interface and the configured grant of the sidelink interface may be indexed separately or collectively.

Optionally, in the foregoing embodiment of the present disclosure, the information of the configured grant allowed to be used by the logical channel carried by the logical channel restriction, includes at least one of the following information:
 first indication information of whether the logical channel is allowed to use the type-1 configured grant;
 second indication information of whether the logical channel is allowed to use the type-2 configured grant;
 a list of identifiers of configured grants allowed to be used by the logical channel;
 a list of identifiers of type-1 configured grants allowed to be used by the logical channel; or,
 a list of identifiers of type-2 configured grants allowed to be used by the logical channel.

In summary, in the foregoing embodiments of the present disclosure, when the network device configures the logical channel for the terminal, a mapping relationship between the logical channel and the configured grant is directly configured, so that the terminal can determine the mapping relationship between the logical channel and the configured grant according to the configuration information of the logical channel. Therefore, this method has less impact on the priority of the logical channel.

It should be noted that the network device provided in the embodiments of the present disclosure is a network device that can perform the foregoing configured grant usage method, and all the embodiments of the foregoing configured grant usage method are applicable to the network device with the same or similar beneficial effects being achieved.

Figure 6:
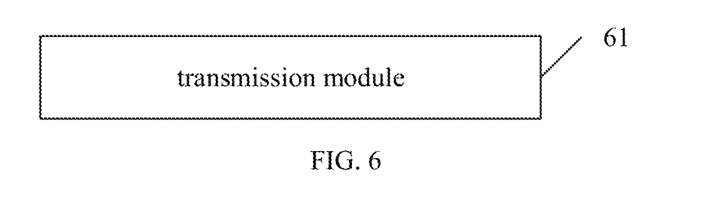
FIG. 6 is a first schematic structural diagram of a configured grant usage apparatus according to an embodiment of the present disclosure.

As shown in FIG. 6, one embodiment of the present disclosure further provides a configured grant usage apparatus applied to a network device. The configured grant usage apparatus includes:

a transmission module 61 configured to transmit configuration information of logical channel to a terminal, where a mapping relationship between the logical channel and a configured grant allocated to the terminal is configured in the configuration information.

Optionally, in the foregoing embodiment of the present disclosure, the configured grant includes: type-1 configured grant and/or type-2 configured grant.

Optionally, in the foregoing embodiment of the present disclosure, the logical channel includes: logical channel on Uu interface and/or logical channel on sidelink interface.

Optionally, in the foregoing embodiment of the present disclosure, in a case that the logical channel is logical channel in Uu interface, the configured grant is: a configured grant of the Uu interface; and/or, in a case that the logical channel is logical channel in sidelink interface, the configured grant is: a configured grant of the sidelink interface.

Optionally, in the foregoing embodiment of the present disclosure, the configuration information is a logical channel restriction corresponding to logical channel, and the logical channel restriction carries information of a configured grant allowed to be used by the logical channel.

The information of a configured grant allowed to be used by the logical channel is used to indicate the mapping relationship between the logical channel and the configured grant allocated to the terminal.

Optionally, in the foregoing embodiment of the present disclosure, the information of the configured grant allowed to be used by the logical channel carried in the logical channel restriction, is an index of the configured grant allowed to be used by the logical channel.

The type-1 configured grant of the Uu interface and the type-2 configured grant of the Uu interface may be indexed separately or collectively; or, the type-1 configured grant of the sidelink interface and the type-2 configured grant of the SL interface may be indexed separately or collectively; or, the configured grant of the Uu interface and the configured grant of the sidelink interface may be indexed separately or collectively.

Optionally, in the foregoing embodiment of the present disclosure, the information of the configured grant allowed to be used by the logical channel carried by the logical channel restriction, includes at least one of the following information:

first indication information of whether the logical channel is allowed to use the type-1 configured grant;
second indication information of whether the logical channel is allowed to use the type-2 configured grant;
a list of identifiers of configured grants allowed to be used by the logical channel;
a list of identifiers of type-1 configured grants allowed to be used by the logical channel; or,
a list of identifiers of type-2 configured grants allowed to be used by the logical channel.

In summary, in the foregoing embodiments of the present disclosure, when the network device configures the logical channel for the terminal, a mapping relationship between the logical channel and the configured grant is directly configured, so that the terminal can determine the mapping relationship between the logical channel and the configured grant according to the configuration information of the logical channel. Therefore, this method has less impact on the priority of the logical channel.

It should be noted that the configured grant usage apparatus provided in the embodiments of the present disclosure is an apparatus that can perform the foregoing configured grant usage method, and all the embodiments of the foregoing configured grant usage method are applicable to the apparatus with the same or similar beneficial effects being achieved.

One embodiment of the present disclosure further provides a computer-readable storage medium on which a computer program is stored. The computer program is executed by a processor to perform various procedures of the foregoing configured grant usage method embodiments, with the same technical effect being achieved, which will not be repeated herein to avoid repetition. The computer-readable storage medium, may be, for example, a read-only memory (ROM), a random access memory (RAM), a magnetic disk, or an optical disk, etc.

As shown in FIG. 5, one embodiment of the present disclosure further provides a terminal, including: a transceiver 520, a memory 510, a processor 500, and a program stored on the memory 510 and executable by the processor 500. The processor 500 is configured to read the program in the memory and control the transceiver 520 to execute the following process: receiving configuration information of logical channel, where a mapping relationship between the logical channel and a configured grant allocated by a network device to the terminal is configured in the configuration information.

Optionally, in the foregoing embodiment of the present disclosure, the configured grant includes: type-1 configured grant and/or type-2 configured grant.

Optionally, in the foregoing embodiment of the present disclosure, the logical channel includes: logical channel on Uu interface and/or logical channel on sidelink interface.

Optionally, in the foregoing embodiment of the present disclosure, in a case that the logical channel is logical channel in Uu interface, the configured grant is: a configured grant of the Uu interface; and/or, in a case that the logical channel is logical channel in sidelink interface, the configured grant is: a configured grant of the sidelink interface.

Optionally, in the foregoing embodiment of the present disclosure, the configuration information is a logical channel restriction corresponding to logical channel, and the logical channel restriction carries information of a configured grant allowed to be used by the logical channel.

The information of a configured grant allowed to be used by the logical channel is used to indicate the mapping relationship between the logical channel and the configured grant allocated to the terminal.

Optionally, in the foregoing embodiment of the present disclosure, the information of the configured grant allowed to be used by the logical channel carried in the logical channel restriction, is an index of the configured grant allowed to be used by the logical channel.

The type-1 configured grant of the Uu interface and the type-2 configured grant of the Uu interface may be indexed separately or collectively; or, the type-1 configured grant of the sidelink interface and the type-2 configured grant of the SL interface may be indexed separately or collectively; or, the configured grant of the Uu interface and the configured grant of the sidelink interface may be indexed separately or collectively.

Optionally, in the foregoing embodiment of the present disclosure, the information of the configured grant allowed to be used by the logical channel carried by the logical channel restriction, includes at least one of the following information:

first indication information of whether the logical channel is allowed to use the type-1 configured grant;

second indication information of whether the logical channel is allowed to use the type-2 configured grant;

a list of identifiers of configured grants allowed to be used by the logical channel;

a list of identifiers of type-1 configured grants allowed to be used by the logical channel; or, a list of identifiers of type-2 configured grants allowed to be used by the logical channel.

In summary, in the foregoing embodiments of the present disclosure, when the network device configures the logical channel for the terminal, a mapping relationship between the logical channel and the configured grant is directly configured, so that the terminal can determine the mapping relationship between the logical channel and the configured grant according to the configuration information of the logical channel. Therefore, this method has less impact on the priority of the logical channel.

It should be noted that the terminal provided in the embodiments of the present disclosure is a terminal that can perform the foregoing configured grant usage method, and all the embodiments of the foregoing configured grant usage method are applicable to the terminal with the same or similar beneficial effects being achieved.

Figure 7:
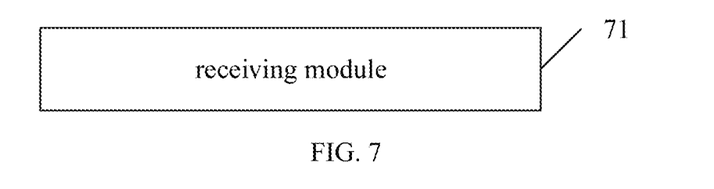
FIG. 7 is a second schematic structural diagram of a configured grant usage apparatus according to an embodiment of the present disclosure.

As shown in FIG. 7, one embodiment of the present disclosure further provides a configured grant usage apparatus applied to a terminal. The configured grant usage apparatus includes:

a receiving module 71 configured to receive configuration information of logical channel, where a mapping relationship between the logical channel and a configured grant allocated by a network device to the terminal is configured in the configuration information.

Optionally, in the foregoing embodiment of the present disclosure, the configured grant includes: type-1 configured grant and/or type-2 configured grant.

Optionally, in the foregoing embodiment of the present disclosure, the logical channel includes: logical channel on Uu interface and/or logical channel on sidelink interface.

Optionally, in the foregoing embodiment of the present disclosure, in a case that the logical channel is logical channel in Uu interface, the configured grant is: a configured grant of the Uu interface; and/or, in a case that the logical channel is logical channel in sidelink interface, the configured grant is: a configured grant of the sidelink interface.

Optionally, in the foregoing embodiment of the present disclosure, the configuration information is a logical channel restriction corresponding to logical channel, and the logical channel restriction carries information of a configured grant allowed to be used by the logical channel.

The information of a configured grant allowed to be used by the logical channel is used to indicate the mapping relationship between the logical channel and the configured grant allocated to the terminal.

Optionally, in the foregoing embodiment of the present disclosure, the information of the configured grant allowed to be used by the logical channel carried in the logical channel restriction, is an index of the configured grant allowed to be used by the logical channel.

The type-1 configured grant of the Uu interface and the type-2 configured grant of the Uu interface may be indexed separately or collectively; or, the type-1 configured grant of the sidelink interface and the type-2 configured grant of the SL interface may be indexed separately or collectively; or, the configured grant of the Uu interface and the configured grant of the sidelink interface may be indexed separately or collectively.

Optionally, in the foregoing embodiment of the present disclosure, the information of the configured grant allowed to be used by the logical channel carried by the logical channel restriction, includes at least one of the following information:

first indication information of whether the logical channel is allowed to use the type-1 configured grant;

second indication information of whether the logical channel is allowed to use the type-2 configured grant;

a list of identifiers of configured grants allowed to be used by the logical channel;

a list of identifiers of type-1 configured grants allowed to be used by the logical channel; or, a list of identifiers of type-2 configured grants allowed to be used by the logical channel.

In summary, in the foregoing embodiments of the present disclosure, when the network device configures the logical channel for the terminal, a mapping relationship between the logical channel and the configured grant is directly configured, so that the terminal can determine the mapping relationship between the logical channel and the configured grant according to the configuration information of the logical channel. Therefore, this method has less impact on the priority of the logical channel.

It should be noted that the configured grant usage apparatus provided in the embodiments of the present disclosure is an apparatus that can perform the foregoing configured grant usage method, and all the embodiments of the foregoing configured grant usage method are applicable to the apparatus with the same or similar beneficial effects being achieved.

One embodiment of the present disclosure further provides a computer-readable storage medium on which a computer program is stored. The computer program is executed by a processor to perform various procedures of the foregoing configured grant usage method embodiments, with the same technical effect being achieved, which will not be repeated herein to avoid repetition. The computer-readable storage medium, may be, for example, a read-only memory (ROM), a random access memory (RAM), a magnetic disk, or an optical disk, etc.

It should be noted that the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the description of the foregoing implementations, a person skilled in the art can clearly understand that the method in the foregoing embodiments may be implemented by software on a necessary universal hardware platform or by hardware only. In most cases, the former is a more preferred implementation. Based on such an understanding, the technical solutions of this disclosure essentially or a part thereof that contributes to related technologies may be embodied in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

The embodiments of this disclosure are described above with reference to the accompanying drawings, but this disclosure is not limited to the foregoing implementations. The foregoing implementations are only illustrative rather than restrictive. Inspired by this disclosure, a person of ordinary skill in the art can still derive many variations without departing from the essence of this disclosure and the protection scope of the claims. All these variations shall fall within the protection of this disclosure.

The above are optional embodiments of the present disclosure. It should be noted that those skilled in the art may make several improvements and modifications without departing from the principles of the present disclosure and these improvements and modifications are covered by the protection scope of the present disclosure.

What is claimed is:

1. A configured grant usage method performed by a network device, comprising:
   transmitting configuration information of logical channel to a terminal, wherein a mapping relationship between the logical channel and a configured grant is configured in the configuration information;
   wherein the configuration information is a logical channel restriction corresponding to the logical channel, and the logical channel restriction carries information of a configured grant allowed to be used by the logical channel;
   the information of the configured grant allowed to be used by the logical channel indicates the mapping relationship between the logical channel and the configured grant allocated to the terminal;
   wherein the information of the configured grant allowed to be used by the logical channel carried by the logical channel restriction, includes at least one of the following information:
   a list of identifiers of configured grants allowed to be used by the logical channel;
   a list of identifiers of type-1 configured grants allowed to be used by the logical channel; or,
   a list of identifiers of type-2 configured grants allowed to be used by the logical channel;
   wherein the logical channel includes: logical channel in Uu interface and/or logical channel in sidelink interface;
   wherein in a case that the logical channel is the logical channel in the Uu interface, the configured grant is: a configured grant of the Uu interface; and/or,
   in a case that the logical channel is the logical channel in the sidelink interface, the configured grant is: a configured grant of the sidelink interface;
   wherein the information of the configured grant allowed to be used by the logical channel carried in the logical channel restriction, is an index of the configured grant allowed to be used by the logical channel; wherein type-1 configured grants of Uu interface and type-2 configured grants of the Uu interface are indexed jointly; or, type-1 configured grants of sidelink interface and type-2 configured grants of the sidelink interface are indexed jointly; or, configured grants of the Uu interface and configured grants of the sidelink interface are indexed jointly.

2. The method according to claim 1, wherein the configured grant includes: type-1 configured grant and/or type-2 configured grant.

3. A configured grant usage method performed by a terminal, comprising:
   receiving configuration information of logical channel, wherein a mapping relationship between the logical channel and a configured grant allocated by a network device to the terminal is configured in the configuration information;
   wherein the configuration information is a logical channel restriction corresponding to the logical channel, and the logical channel restriction carries information of a configured grant allowed to be used by the logical channel;
   the information of the configured grant allowed to be used by the logical channel indicates the mapping relationship between the logical channel and the configured grant allocated to the terminal;
   wherein the information of the configured grant allowed to be used by the logical channel carried by the logical channel restriction, includes at least one of the following information:
   a list of identifiers of configured grants allowed to be used by the logical channel;
   a list of identifiers of type-1 configured grants allowed to be used by the logical channel; or,
   a list of identifiers of type-2 configured grants allowed to be used by the logical channel;
   wherein the configured grant includes a configured grant of Uu interface and/or a configured grant of sidelink interface;
   wherein in a case that the logical channel is logical channel in the Uu interface, the configured grant is: a configured grant of the Uu interface; and/or, in a case that the logical channel is logical channel in the sidelink interface, the configured grant is: a configured grant of the sidelink interface;
   wherein the information of the configured grant allowed to be used by the logical channel carried in the logical channel restriction, is an index of the configured grant allowed to be used by the logical channel;
   type-1 configured grants of Uu interface and type-2 configured grants of the Uu interface are indexed jointly; or, type-1 configured grants of sidelink interface and type-2 configured grants of the sidelink interface are indexed jointly; or, configured grants of the Uu interface and configured grants of the sidelink interface are indexed jointly.

4. The method according to claim 3, wherein the configured grant includes: type-1 configured grant and/or type-2 configured grant.

5. A network device, comprising: a transceiver, a memory, a processor, and a program stored in the memory and executable by the processor;

wherein the processor is used to read the program in the memory and control the transceiver to perform the following process: transmitting configuration information of logical channel to a terminal, wherein a mapping relationship between the logical channel and a configured grant allocated to the terminal is configured in the configuration information;

wherein the configuration information is a logical channel restriction corresponding to the logical channel, and the logical channel restriction carries information of a configured grant allowed to be used by the logical channel;

the information of the configured grant allowed to be used by the logical channel indicates the mapping relationship between the logical channel and the configured grant allocated to the terminal;

wherein the information of the configured grant allowed to be used by the logical channel carried by the logical channel restriction, includes at least one of the following information:

a list of identifiers of configured grants allowed to be used by the logical channel;

a list of identifiers of type-1 configured grants allowed to be used by the logical channel; or, a list of identifiers of type-2 configured grants allowed to be used by the logical channel;

wherein the logical channel includes: logical channel in Uu interface and/or logical channel in sidelink interface;

wherein in a case that the logical channel is the logical channel in the Uu interface, the configured grant is: a configured grant of the Uu interface; and/or, in a case that the logical channel is the logical channel in the sidelink interface, the configured grant is: a configured grant of the sidelink interface;

wherein the information of the configured grant allowed to be used by the logical channel carried in the logical channel restriction, is an index of the configured grant allowed to be used by the logical channel; type-1 configured grants of Uu interface and type-2 configured grants of the Uu interface are indexed jointly; or, type-1 configured grants of sidelink interface and type-2 configured grants of the sidelink interface are indexed jointly; or, configured grants of the Uu interface and configured grants of the sidelink interface are indexed jointly.

6. The network device according to claim 5, wherein the configured grant includes: type-1 configured grant and/or type-2 configured grant.

7. A terminal, comprising: a transceiver, a memory, a processor, and a program stored in the memory and executable by the processor;

wherein the processor is used to read the program in the memory and control the transceiver to perform the following process: receiving configuration information of logical channel, wherein a mapping relationship between the logical channel and a configured grant allocated by a network device to the terminal is configured in the configuration information;

wherein the configuration information is a logical channel restriction corresponding to the logical channel, and the logical channel restriction carries information of a configured grant allowed to be used by the logical channel;

the information of the configured grant allowed to be used by the logical channel indicates the mapping relationship between the logical channel and the configured grant allocated to the terminal;

wherein the information of the configured grant allowed to be used by the logical channel carried by the logical channel restriction, includes at least one of the following information:

a list of identifiers of configured grants allowed to be used by the logical channel;

a list of identifiers of type-1 configured grants allowed to be used by the logical channel; or, a list of identifiers of type-2 configured grants allowed to be used by the logical channel;

wherein the configured grant includes a configured grant of Uu interface and/or a configured grant of sidelink interface;

wherein in a case that the logical channel is logical channel in the Uu interface, the configured grant is: a configured grant of the Uu interface; and/or, in a case that the logical channel is logical channel in the sidelink interface, the configured grant is: a configured grant of the sidelink interface;

wherein the information of the configured grant allowed to be used by the logical channel carried in the logical channel restriction, is an index of the configured grant allowed to be used by the logical channel;

type-1 configured grants of Uu interface and type-2 configured grants of the Uu interface are indexed jointly; or, type-1 configured grants of sidelink interface and type-2 configured grants of the sidelink interface are indexed jointly; or, configured grants of the Uu interface and configured grants of the sidelink interface are indexed jointly.

8. The terminal according to claim 7, wherein the configured grant includes: type-1 configured grant and/or type-2 configured grant.

* * * * *